(12) United States Patent
Yamada

(10) Patent No.: US 8,432,710 B2
(45) Date of Patent: Apr. 30, 2013

(54) POWER CONVERSION APPARATUS

(75) Inventor: Ryuji Yamada, Hachioji (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 423 days.

(21) Appl. No.: 12/913,148

(22) Filed: Oct. 27, 2010

(65) Prior Publication Data

US 2011/0096577 A1    Apr. 28, 2011

(30) Foreign Application Priority Data

Oct. 28, 2009  (JP) .................................. 2009-247716
Jan. 20, 2010  (JP) .................................. 2010-010230

(51) Int. Cl.
  *H02M 1/12*   (2006.01)
  *H02M 1/14*   (2006.01)
(52) U.S. Cl.
  USPC ................ 363/44; 363/40; 363/127; 363/132
(58) Field of Classification Search .................... 363/40, 363/44, 45, 48, 125, 127, 131, 132
  See application file for complete search history.

(56) References Cited

U.S. PATENT DOCUMENTS

| | | | | |
|---|---|---|---|---|
| 5,835,371 A | * | 11/1998 | Kume et al. | 363/132 |
| 8,289,737 B2 | * | 10/2012 | Wildash | 363/44 |
| 8,363,434 B2 | * | 1/2013 | Lin | 363/44 |
| 2006/0164874 A1 | * | 7/2006 | Sasaki et al. | 363/44 |
| 2011/0096577 A1 | * | 4/2011 | Yamada | 363/44 |
| 2011/0122667 A1 | * | 5/2011 | Mino et al. | 363/125 |

FOREIGN PATENT DOCUMENTS

| | | |
|---|---|---|
| JP | 2002-119065 A | 4/2002 |
| JP | 2009-033891 A | 2/2009 |

* cited by examiner

*Primary Examiner* — Jeffrey Sterrett
(74) *Attorney, Agent, or Firm* — Rabin & Berdo, P.C.

(57) ABSTRACT

A power conversion apparatus has a rectification circuit provided for converting AC power supplied from an AC power supply into DC power. The rectification circuit has a configuration in which series circuit whose number corresponds to the number of phases of an input AC are connected in parallel between a positive-side line and a negative-side line. The AC power supply is connected to AC input points, each corresponding to a connection point between a rectifying device and a semiconductor switching device in each of the series circuits, and connected to a point having ground potential through noise suppressing series circuits respectively. In each of the noise suppressing series circuits, a switch unit and a capacitor are connected in series. In this manner, it is possible to provide a power conversion apparatus which can reduce a noise terminal voltage while solving problems in volume and cost simultaneously.

17 Claims, 9 Drawing Sheets

POWER CONVERSION APPARATUS

CROSS-REFERENCE TO RELATED APPLICATION

This application claims priority under 35 U.S.C. §119 from Japanese Patent Application 2009-247716, filed Oct. 28, 2009, and from Japanese Patent Application 2010-010230, filed Jan. 20, 2010, the entireties of which are incorporated herein by reference.

BACKGROUND OF THE INVENTION

1. Field of the Invention

The present invention relates to a power conversion apparatus using a semiconductor switching device.

2. Description of the Background Art

For example, a configuration shown in FIG. 8 is known as a power conversion apparatus of such a type.

The power conversion apparatus shown in FIG. 8 has a single-phase AC power supply 101, a rectifier 102 for converting AC output power of the AC power supply 101 into DC power, a smoothing capacitor 103 for smoothing the DC power outputted from a positive-side line Lp and a negative-side line Ln of the rectifier 102, and a DC load 104 connected between the positive-side line Lp and the negative-side line Ln.

The rectifier 102 has a configuration in which series circuits 107 and 108 are connected in parallel between the positive-side line Lp and the negative-side line Ln. In each series circuit 107, 108, a diode 105a, 105b serving as a rectifying device and, for example, a MOSFET 106a, 106b serving as a semiconductor switching device are connected in series. Here, since each MOSFET 106a, 106b has a body diode internally, each MOSFET 106a, 106b is always conductive as to a reverse current regardless of its gate voltage.

Each AC input point Pia, Pib corresponding to a connection point between the diode 105a, 105b and the MOSFET 106a, 106b in each series circuit 105, 106 is connected to the AC power supply 101 through an inductor 109a, 109b.

In addition, a series circuit of grounded capacitors 110a and 110b serving as a noise filter is connected between power supply lines La and Lb which connect the inductors 109a and 109b to the output side of the AC power supply 101 respectively. A connection point between the grounded capacitors 110a and 110b is connected to ground potential G.

The power conversion apparatus shown in FIG. 8 has a function by which an AC input current Iin of the AC power supply 101 inputted into the rectifier 102 can be formed into a sine waveform whose phase is equal to that of the AC input voltage Vin while a DC output voltage Ed is kept at a desired value which is higher than the peak value of the AC input voltage Vin.

Description will be made below of the operation for implementing such a function.

For example, assume that the AC input voltage Vin is positive. In this case, when the MOSFET 106a is turned on, a current flows in a path from the AC power supply 101 back to the AC power supply 101 via the power supply line La, the inductor 109a, the MOSFET 106a, the MOSFET 106b, the inductor 109b and the power supply line Lb. Thus, the voltage of the AC power supply 101 is applied to the inductors 109a and 109b half-and-half (e.g., in an even split) to increase the AC input current Iin.

When the MOSFET 106a is turned off in this state, the current flows in a path from the AC power supply 101 back to the AC power supply 101 via the power supply line La, the inductor 109a, the diode 105a, the smoothing capacitor 103, the MOSFET 106b, the inductor 109b and the power supply Lb. On this occasion, a differential voltage between the DC output voltage Ed and the AC input voltage Vin is applied to the inductors 109a and 109b half-and-half. Since the DC output voltage Ed is kept higher than the peak value of the AC input voltage Vin due to the operation of the circuit, the AC input current Iin is reduced.

Accordingly, when a ratio between on-time and off-time (i.e. a duty ratio) of the MOSFET 106a is controlled, the waveform and magnitude of the AC input current Iin can be controlled desirably. Thus, the waveform of the AC input current Iin can be formed into a sine waveform (taking no account of a ripple component here). In addition, when the amplitude of the AC input current Iin is controlled in accordance with load power, the DC output voltage Ed can be kept at a desired value.

When the AC input voltage Vin is negative, a similar operation is performed by on-off operation of the MOSFET 106b. Here, the MOSFET 106b is conductive reversely regardless of its gate signal when the AC input voltage Vin is positive (the MOSFET 106a performs on-off operation), and the MOSFET 106a is conductive reversely regardless of its gate signal when the AC input voltage Vin is negative (the MOSFET 106b performs on-off operation).

Generally in the power conversion apparatus performing switching thus, noise is generated due to fluctuation of potential provided every switching. The noise is prevented from flowing to the outside by the grounded capacitors 110a and 110b as a noise filter. Here, when the neutral point potential of the AC input voltage Vin corresponds to the ground potential G, the voltage of each grounded capacitor 110a, 110b is Vin/2. FIG. 9 shows a change of potential at each point relative to the ground potential G due to switching. At the timing when the MOSFETs 106a and 106b are on, points U and V at the opposite ends of the grounded capacitors 110a and 110b are short-circuited, and voltages VL1 and VL2 of the opposite ends of the inductors 109a and 109b are expressed by VL1=VL2=Vin/2 as described previously. Here, since the potential at the point U is +Vin/2 and the potential at the point V is −Vin/2, the potential at each AC input point Pia, Pib is 0V. Since the MOSFETs 106a and 106b are conductive, the potential at the AC input point Pia, Pib is also equal to the potential at a negative-side point N of the smoothing capacitor 103. Hence, the potential at the point N is 0V. The potential at a positive-side point P of the smoothing capacitor 103 is equal to the sum of the potential at the point N and the DC output voltage Ed. Hence, the potential at the point P is equal to the DC output voltage Ed.

On the other hand, at the timing when the AC input voltage Vin is positive and the MOSFET 106a is turned off, the potential at the AC input point Pia is equal to the potential at the point P, and the potential at the AC input point Pib is equal to the potential at the point N. Accordingly, the DC output voltage Ed is applied between the points U and V at the opposite ends of the grounded capacitors 110a and 110b. Hence the relation of VL1=VL2=(Vin−Ed)/2 is established. Thus, the potential at the point Pia (=the potential at the point P) is expressed by Vin/2−(Vin−Ed)/2=+Ed/2, and the potential at the point Pib is expressed by −Vin/2+(Vin−Ed)/2=−Ed/2. That is, the potential at the point Pia fluctuates by +Ed/2, and the potential at each point Pib, P, N fluctuates by −Ed/2.

Due to the same operation, at the timing when the AC input Voltage Vin is negative and the MOSFET 106b is turned off, the potential at the point Pib fluctuates by +Ed/2 and the potential at each point Pia, P, N fluctuates by −Ed/2. When the MOSFETs 106*a* and 106*b* are turned on again, potential fluctuation is reversed.

In the background-art example shown in FIG. 8, there are unintended parasitic capacitances 111, 112, 113 and 114 between each point and a frame FG of the apparatus. Since the frame FG is grounded for safety reasons, the parasitic capacitances 111 to 114 act as earth capacitances. As a result of the aforementioned potential fluctuation, a current flows into each parasitic capacitance to circulate a current Ie in the circuit through the grounded capacitors 110*a* and 110*b* as shown in FIG. 8. On this occasion, a so-called noise terminal voltage which is a high-frequency voltage is generated in each grounded capacitor 110*a*, 110*b*.

The noise terminal voltage must be limited in order not to give bad influence to another apparatus connected to the AC power supply 101. It is the simplest method to increase the capacitances of the ground capacitors 110*a* and 110*b*. However, the grounded capacitors 110*a* and 110*b* permit not only a high-frequency current but also a low-frequency current derived from the AC input voltage Vin as a leak current. Therefore, the capacitances made too high may lead to problems such as earth leakage circuit breaker tripping. There is another well-known method in which a common mode choke coil is inserted between the apparatus and the power supply. However, the common mode choke coil, which must allow a main circuit current to flow therein, is bound to increase in its outer shape. Thus, the common mode choke coil prevents a power conversion apparatus from being miniaturized, and further leads to cost increase.

On the other hand, as a noise suppressing method using a switching unit, there is known a noise reduction apparatus as follows (e.g. see JP-A-2002-119065). That is, in the noise reduction apparatus, for example, a current supply circuit including a switching device for generating a current in a reverse direction to a noise current detected by a noise detection unit is connected between a voltage clamp circuit using an energy regenerating transformer connected to a smoothing capacitor and ground potential G so as to suppress noise.

As another noise suppressing method, there is known an electric vehicle as follows (e.g. see JP-A-2009-33891). That is, in the electric vehicle, an electrostatic capacitance is connected in series with an intrinsic stray capacitance between a high-voltage system component including an inverter or a motor generator and the vehicle earth, and a connection switch is connected in parallel to the electrostatic capacitance so that the connection switch is controlled to be on when a load is driven, and to be off when the load is not driven.

However, in the background-art example disclosed in JP-A-2002-119065, the switching unit itself must produce the current to cancel the noise. Thus, there remains an unresolved problem that the configuration of the switching unit becomes complicated because the switching unit has to switch at an extremely high speed and, at the same time, has to be controlled at a high speed.

On the other hand, in the background-art example disclosed in JP-A-2009-33891, the earth capacitance is changed in accordance with the connection condition of the apparatus as a whole to the outside, so as to adjust the potential fluctuation of the apparatus and the magnitude of the leak current. There remains an unresolved problem as follows. That is, the background-art example cannot be applied when the connection condition of the apparatus as a whole to the outside is fixed, and further, the leak current cannot be reduced when the apparatus serving as a noise source is operating.

SUMMARY OF THE INVENTION

Various non-limiting embodiments of the invention were therefore developed in consideration of the aforementioned unresolved problems in the background art. Advantageously, the embodiments can provide a power conversion apparatus which can reduce a noise terminal voltage while solving problems in volume and cost simultaneously.

According to the various non-limiting embodiments, there is provided a power conversion apparatus according to an aspect of the invention, including an AC power supply and a rectification circuit which converts AC power inputted from the AC power supply into DC power. The rectification circuit has a configuration in which series circuits, each of which includes a rectifying device and a semiconductor switching device connected in series and whose number corresponds to a number of phases of an input AC power, are connected in parallel between a positive-side line and a negative-side line. The AC power supply is connected through inductance devices to AC input points corresponding to connection points between the rectifying devices and the semiconductor switching devices of the series circuits, respectively. The AC input points of the series circuits and a point serving as ground potential are connected through noise suppressing series circuits in each of which a switch unit and a capacitor are connected in series. The switch unit of each of the noise suppressing series circuits is controlled to be on at a timing when the semiconductor switching device connected to the noise suppressing series circuit switches at a high frequency, and to be off at another timing than the first-mentioned timing.

In addition, there is provided a power conversion apparatus according to other non-limiting embodiments, wherein each of the noise suppressing series circuits includes a resistor connected in parallel to the switch unit, and a resistance value of the resistor is set to be sufficiently lower than an impedance of the capacitor to a frequency of AC input power at the AC input point, and to be sufficiently higher than the impedance of the capacitor to a switching frequency of the semiconductor switching device.

Further, there is provided a power conversion apparatus according to another aspect of the embodiments, including an inverter circuit which converts DC input power into AC power. The inverter circuit has a configuration in which switching arms, each of which includes plural semiconductor switching devices connected in series and whose number corresponds to a number of phases of AC power to be outputted, are connected in parallel between a positive-side line and a negative-side line. AC output points of the switching arms are connected to AC output terminals through inductance devices respectively. The AC output points of the switching arms and a point serving as ground potential are connected through noise suppressing series circuits in each of which a switch unit and a capacitor are connected in series. The switch unit of each of the noise suppressing series circuits is controlled to be on at a timing when the semiconductor switching device connected to the noise suppressing series circuit switches at a high frequency, and to be off at another timing than the first-mentioned timing.

In addition, there is provided a power conversion apparatus according to another aspect of the embodiments, wherein each of the noise suppressing series circuits includes a resistor connected in parallel to the switch unit, and a resistance value of the resistor is set to be sufficiently lower than an impedance of the capacitor to a frequency of AC output power at the AC output point and to be sufficiently higher than the impedance of the capacitor to a switching frequency of the semiconductor switching device.

In addition, there is provided a power conversion apparatus according to another aspect of the embodiments, wherein, the switch unit includes an assistant semiconductor switching device using a connection point to each of the switching arms as reference potential for on-off control, and an on-off control terminal of the assistant semiconductor switching device is connected to either a positive side or a negative side of the DC power through a capacitor.

In addition, there is provided a power conversion apparatus according to another aspect of the embodiments, wherein the switch unit includes an assistant semiconductor switching device which can on-off control a forward current and which is always conductive as to a reverse current.

In addition, there is provided a power conversion apparatus according to another aspect of the embodiments, wherein the assistant semiconductor switching device uses a connection point to each of the switching arms as reference potential for on-off control, and an on-off control terminal of the assistant semiconductor switching device is connected to either a positive side or a negative side of the DC power through a capacitor.

According to the various non-limiting embodiments, due to a grounded capacitor added in accordance with operation of each semiconductor switching device, earth capacitance at a point whose potential is positive with respect to the ground potential is made equal to earth capacitance at a point whose potential is negative with respect to the ground potential, so that high-frequency leak currents from those points can be canceled with each other. Thus, there is an effect that a noise terminal voltage can be suppressed without provision of any large-sized noise reduction component.

DETAILED DESCRIPTION OF THE INVENTION

Embodiments of the invention will be described below with reference to the drawings.

Figure 1:
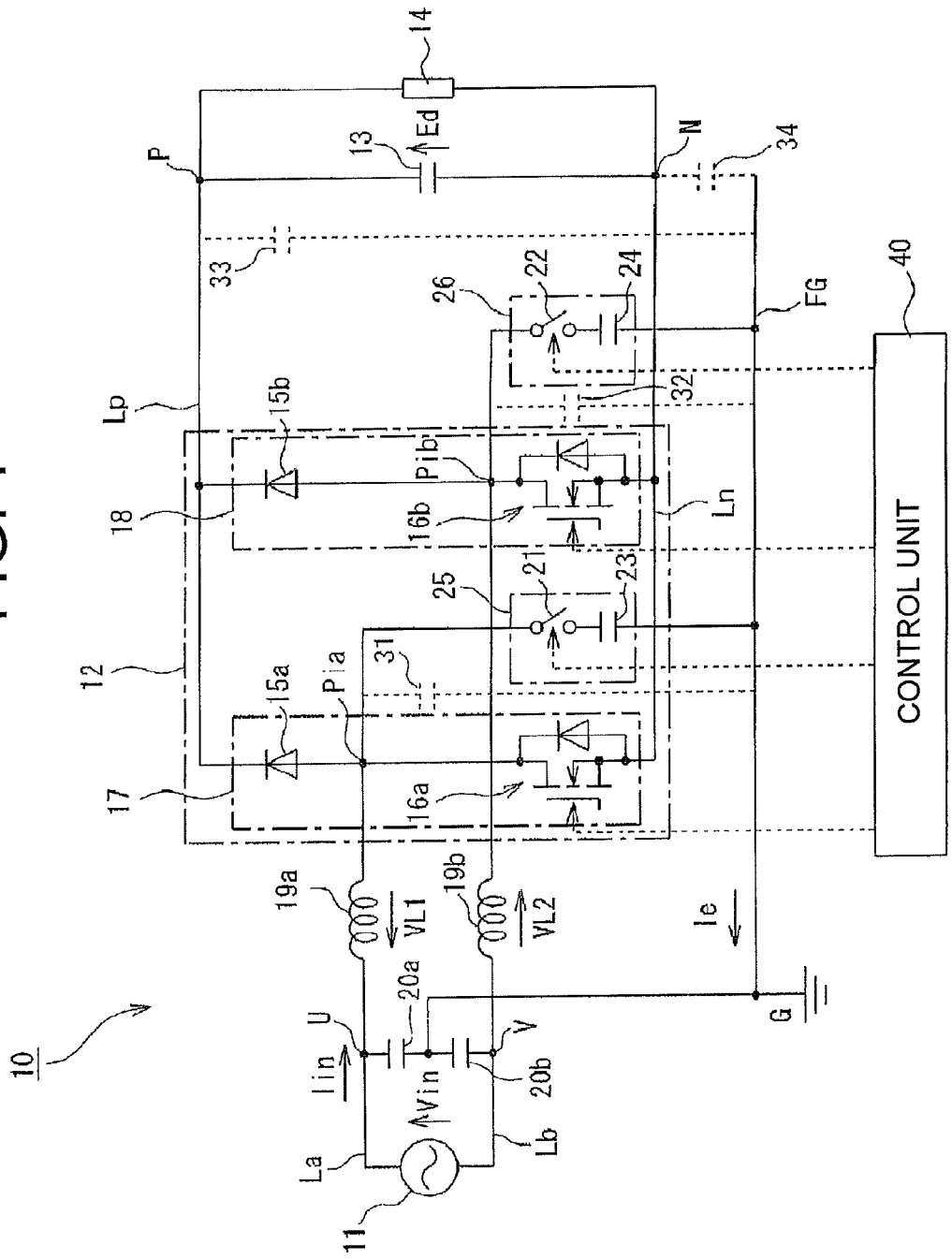
FIG. 1 is a circuit diagram of a power conversion apparatus showing a first embodiment of the invention.

FIG. 1 is a circuit diagram showing a power conversion apparatus according to a first embodiment of the invention. In FIG. 1, the reference numeral 10 represents a power conversion apparatus for driving a DC load. The power conversion apparatus 10 has, for example, a single-phase AC power supply 11, a rectification circuit 12, a smoothing capacitor 13 and a DC load 14. The rectification circuit 12 converts AC output power of the AC power supply 11 into DC power. The smoothing capacitor 13 smoothes the DC power outputted from a positive-side line Lp and a negative-side line Ln of the rectification circuit 12. The DC load 14 is connected between the positive-side line Lp and the negative-side line Ln.

The rectification circuit 12 has a configuration in which series circuits 17 and 18 are connected in parallel between the positive-side line Lp and the negative-side line Ln. In each series circuit 17, 18, a diode 15a, 15b serving as a rectifying device and, for example, a MOSFET 16a, 16b serving as a semiconductor switching device are connected in series. Here, each MOSFET 16a, 16b has a body diode internally. Hence, the MOSFET 16a, 16b is always conductive as to a reverse current regardless of its gate voltage.

An AC input point Pia, Pib corresponding to a connection point between the diode 15a, 15b and the MOSFET 16a, 16b of the series circuit 17, 18 is connected to the AC power supply 11 through a inductor 19a, 19b.

In addition, a series circuit of grounded capacitors 20a and 20b forming a noise filter is connected between power supply lines La and Lb which connect the inductors 19a and 19b to the output side of the AC power supply 11, and a connection point between the grounded capacitors 20a and 20b is connected to ground potential G.

The abovementioned configuration is similar to the configuration of the aforementioned background-art example. According to embodiments of the invention, however, a noise suppressing series circuit 25, 26 constituted by a switch circuit 21, 22 as a switch unit and a capacitor 23, 24 is connected between the AC input point Pia, Pib of the series circuit 17, 18 in the rectification circuit 12 and the ground potential G.

Here, each switch circuit 21, 22 is, for example, constituted by two MOSFETs connected in series and in reverse directions to each other. In addition, the capacitance of the capacitor 23 is set to make the value of the sum of a parasitic capacitance 31 and the capacitance of the capacitor 23 equal to the value of the sum of parasitic capacitances 32, 33 and 34. The parasitic capacitance 31 exists between the AC input point Pia and the ground potential G. The parasitic capacitance 32 exists between the AC input point Pib and the ground potential G. The parasitic capacitance 33 exists between a point P and the ground potential G. The point P corresponds to a connection point where the smoothing capacitor 13 is connected to the positive-side line Lp. The parasitic capacitance 34 exists between a point N and the ground potential G. The point N corresponds to a connection point where the smoothing capacitor 13 is connected to the negative-side line Ln. Further, the capacitance of the capacitor 24 is set to make the value of the sum of the parasitic capacitance 32 existing between the AC input point Pib and the ground potential G and the capacitance of the capacitor 24 equal to the value of the sum of the parasitic capacitance 31 existing between the AC input point Pia and the ground potential G, the parasitic capacitance 33 existing between the point P (which corresponds to a connection point where the smoothing capacitor 13 is connected to the positive-side line Lp) and the ground potential G, and the parasitic capacitance 34 existing between the point N (which corresponds to a connection point where the smoothing capacitor 13 is connected to the negative-side line Ln) and the ground potential G.

The power conversion apparatus shown in FIG. 1 has a function as follows. That is, an AC input current Iin of the AC power supply 11 supplied to the rectification circuit 12 is formed into a sine waveform whose phase is equal to the phase of an AC input voltage Vin, while a DC output voltage Ed is kept at a desired value higher than the peak value of the AC input voltage Vin.

The MOSFETs 16a and 16b and the switch circuits 21 and 22 are on-off controlled by a control unit 40.

Next, the operation of the first embodiment will be described with reference to signal waveform charts shown in FIGS. 2A-2G.

Figure 2A:
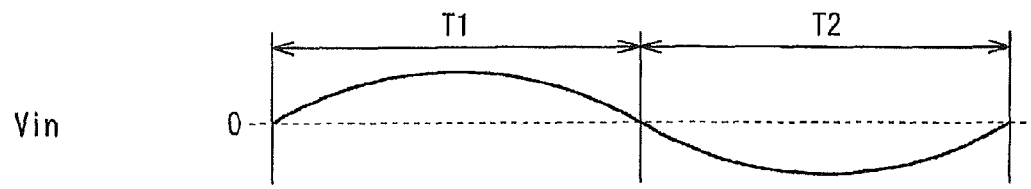
FIGS. 2A-2G are waveform charts provided for explaining the operation of the first embodiment.

For example, assume that the AC input voltage Vin is positive as shown by a section T1 in FIG. 2A. When the MOSFET 16a is turned on in this state, a current flows in a path from the AC power supply 11 back to the AC power supply 11 via the power supply line La, the inductor 19a, the MOSFET 16a, the MOSFET 16b, the inductor 19b and the power supply line Lb. Thus, the voltage of the AC power supply 11 is applied to the inductors 19a and 19b half-and-half (e.g., is split or divided evenly between the inductors 19a and 19b) to increase the AC input current Iin.

When the MOSFET 16a is turned off in this state, the current flows in a path from the AC power supply 11 back to the AC power supply 11 via the power supply line La, the inductor 19a, the diode 15a, the smoothing capacitor 13, the MOSFET 16b, the inductor 19b and the power supply Lb. On this occasion, a differential voltage between the DC output voltage Ed and the AC input voltage Vin is applied to the inductors 19a and 19b half-and-half. Since the DC output voltage Ed is kept higher than the peak value of the AC input voltage Vin due to the operation of the circuit, the AC input current Iin is reduced.

Accordingly, when a ratio between on-time and off-time (i.e. a duty ratio) of the MOSFET 16a is controlled, the waveform and magnitude of the AC input current Iin can be controlled desirably. Thus, the waveform of the AC input current Iin can be formed into a sine waveform (taking no account of a ripple component here). In addition, when the amplitude of the AC input current Iin is controlled in accordance with load power, the DC output voltage Ed can be kept at a desired value.

When the AC input voltage Vin is negative, an on-off operation of the MOSFET 16b is similar to the above-described on-off operation, as shown in a section T2 in FIG. 2A. Here, the MOSFET 16b is conductive reversely regardless of its gate signal when the AC input voltage Vin is positive (e.g., when the MOSFET 16a performs an on-off operation), and the MOSFET 16a is conductive reversely regardless of its gate signal when the AC input voltage Vin is negative (e.g., when the MOSFET 16b performs an on-off operation).

Generally, in the power conversion apparatus performing switching as described in the foregoing, noise is generated due to fluctuation of potential occurring at every switching. The noise is prevented from flowing to the outside by the grounded capacitors 20a and 20b acting as a noise filter. Here, when the neutral point potential of the AC input voltage Vin corresponds to the ground potential G, the voltage of each grounded capacitor 20a, 20b is Vin/2. FIGS. 2B to 2G show a change of potential at each point relative to the ground potential G due to switching.

At the timing when the MOSFETs 16a and 16b are on, points U and V at the opposite ends of the grounded capacitors 20a and 20b are short-circuited, and voltages VL1 and VL2 of the opposite ends of the inductors 19a and 19b are expressed by VL1=VL2=Vin/2 as described previously. Here, since the potential at the point U is +Vin/2 and the potential at the point V is −Vin/2, the potential at each AC input point Pia, Pib is 0 V. Since the MOSFETs 16a and 16b are conductive, the potential at the AC input point Pia, Pib is also equal to the potential at the negative-side point N of the smoothing capacitor 13. Hence, the potential at the point N is 0V. The potential at the positive-side point P of the smoothing capacitor 13 is equal to the sum of the potential at the point N and the DC output voltage Ed. Hence, the potential at the point P is equal to the DC output voltage Ed.

On the other hand, at the timing when the AC input voltage Vin is positive and the MOSFET 16a is turned off, the potential at the AC input point Pia is equal to the potential at the point P, and the potential at the AC input point Pib is equal to the potential at the point N. Accordingly, the DC output voltage Ed is applied between the points U and V at the opposite ends of the grounded capacitors 20a and 20b. Hence the relation of VL1=VL2=(Vin−Ed)/2 is established. Thus, the potential at the point Pia (=the potential at the point P) is expressed by Vin/2−(Vin−Ed)/2=+Ed/2, and the potential at the point Pib is expressed by −Vin/2+(Vin−Ed)/2=−Ed/2. That is, the potential at the point Pia fluctuates by +Ed/2, and the potential at each point Pib, P, N fluctuates by −Ed/2.

Due to the same operation, at the timing when the AC input voltage Vin is negative and the MOSFET 16b is turned off, the potential at the point Pib fluctuates by +Ed/2 and the potential at each point Pia, P, N fluctuates by −Ed/2 by similar operation. When the MOSFETs 16a and 16b are turned on again, potential fluctuation is reversed.

When the AC input voltage Vin is positive as shown in the section T1 in FIG. 2A, high-frequency switching is performed to turn on/off the MOSFET 16a at a high frequency. On this occasion, the switch circuit 21 is controlled to be on. As a result, the capacitor 23 is inserted in parallel to the parasitic capacitance 31 existing between the AC input point Pia and the ground potential G. The potential of the capacitor 23 on this occasion becomes equal to the potential at the AC input point Pia as shown in FIG. 2F. Thus, because capacitance which exists between this node and earth potential at a point whose potential is positive when the MOSFET 16a is turned off is made equal to earth capacitance at a point whose potential is negative likewise (e.g., in an equal amount), currents flowing into a frame FG through those points cancel each other. That is, parasitic capacitance currents only circulate through the frame FG inside the power conversion apparatus 10 so as to be prevented from flowing to the outside. Thus, a noise terminal voltage can be suppressed.

In the same manner, when the AC input voltage Vin is negative as shown in the section T2 in FIG. 2A, high-frequency switching is performed to turn on/off the MOSFET 16b at a high frequency. On this occasion, the switch circuit 22 is controlled to be on. As a result, the capacitor 24 is inserted in parallel to the parasitic capacitance 32 existing between the AC input point Pib and the ground potential G. The potential of the capacitor 24 on this occasion becomes equal to the potential at the AC input point Pib as shown in FIG. 2G. Thus, because earth capacitance at a point whose potential is positive when the MOSFET 16b is turned off is made equal to earth capacitance at a point whose potential is negative likewise (e.g., in an equal amount), currents flowing into the frame FG through those points cancel each other. That is, parasitic capacitance currents only circulate through the frame FG inside the power conversion apparatus 10, so as to be prevented from flowing to the outside. Thus, a noise terminal voltage can be suppressed.

In this manner, the switch circuits 21 and 22 are turned on alternately every half period of the AC input voltage Vin so that a noise terminal voltage can be suppressed. It is therefore unnecessary to provide high-frequency switching ability to the switch circuits 21 and 22. In addition, the switch circuits 21 and 22 can be controlled in such a simple manner that the switch circuits 21 and 22 are on/off operated simply in accordance with the polarity of the AC input voltage Vin. Thus, the configuration of the control unit 40 can be made simple.

In addition, a leak current can be suppressed by aggressive use of the fact that there are portions of potential fluctuation different in polarity in the power conversion apparatus 10.

Next, a second embodiment of the invention will be described with reference to FIG. 3.

In this second embodiment, a configuration is arranged so that switch circuits are prevented from being damaged during a withstand voltage test on the power conversion apparatus.

Figure 3:
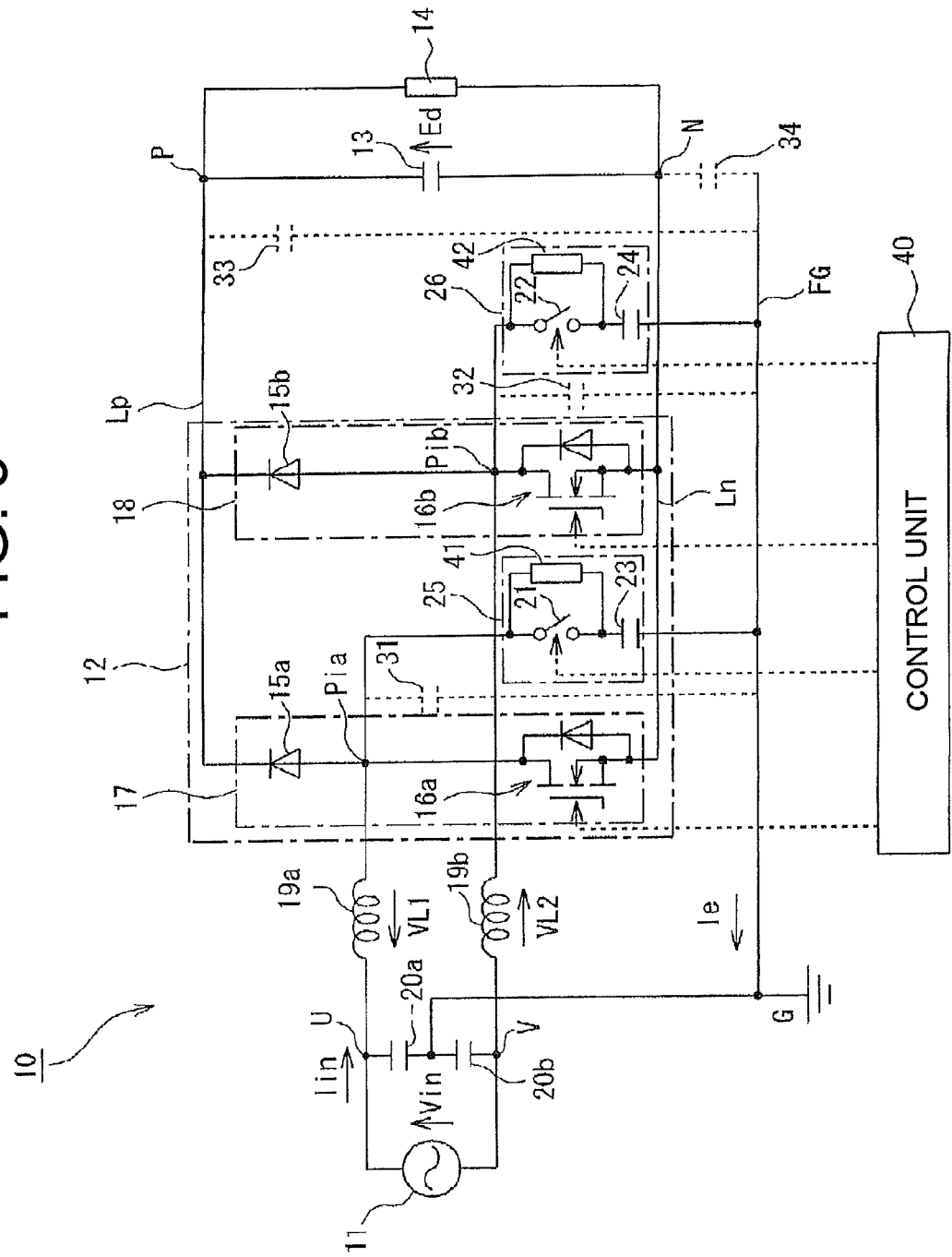
FIG. 3 is a circuit diagram of a power conversion apparatus showing a second embodiment of the invention.

That is, the second embodiment has a similar configuration to that the first embodiment in FIG. 1, except that resistors 41 and 42 are connected in parallel to the switch circuits 21 and 22 as shown in FIG. 3. Parts corresponding to those in FIG. 1 are referred to by the same numerals, and detailed description thereof will be omitted.

In a power supply system, the power conversion apparatus 10 is often required to have a withstand voltage high enough to withstand an earth voltage. A withstand voltage test is performed with a voltage applied between the ground potential and one or both of input lines of the power conversion apparatus 10. The test voltage is set to be higher than a circuit operating voltage. The resistors 41 and 42 are provided to prevent the test voltage from being applied to the switch circuits 21 and 22. The resistance of each resistor 41, 42 is selected to be a value sufficiently lower than the impedance of the capacitor 23, 24 under a voltage with a commercial power frequency as the test voltage, and sufficiently higher than the impedance of the capacitor 23, 24 under a frequency not lower than the switching frequency of the MOSFET 16a, 16b.

For example, assume that the capacitance of the capacitor 23, 24 is 1,000 pF, the commercial power frequency is 50 Hz, and the switching frequency of the MOSFET 16a, 16b is 100 kHz. In this case, the capacitance of the capacitor 23, 24 at 50 Hz has impedance as:

$$1/(2\pi \times 50 \times 1000\text{ p}) = 3.18 M\Omega$$

The capacitance of the capacitor 23, 24 at 100 kHz has impedance as:

$$1/(2\pi \times 100\text{ k} \times 1000\text{ p}) = 1.59 k\Omega$$

In this case, therefore, the resistant value of the resistor 41, 42 is selected to be about 100 kΩ.

According to the second embodiment, for the withstand voltage test, the resistance value of each of the resistors 41 and 42 connected in parallel to the switch circuits 21 and 22 is set to be sufficiently lower than the impedance of the capacitor 23, 24 under the commercial power frequency voltage as the withstand voltage, and to be sufficiently higher than the impedance of the capacitor 23, 24 under a frequency not lower than the switching frequency of the MOSFET 16a, 16b. For example, the resistance value is set at about 100 kΩ. Therefore, during the withstand voltage test, most of the test voltage is shared by the capacitors 23 and 24, so that the test voltage is hardly applied to the switch circuits 21 and 22. In addition, of a high-frequency current generated by switching of the MOSFETs 16a and 16b, parts flowing through the resistors 41 and 42 can be ignored.

For this reason, if the switch circuits 21 and 22 are designed to be able to withstand the test voltage in the withstand voltage test, there will arise a problem that applied components will be increased in size. According to this embodiment, the switch circuits 21 and 22 do not have to withstand a high voltage, by a simple method of connecting the resistors 41 and 42 in parallel to the switch circuits 21 and 22, so that constituent components can be prevented from being increased in size.

Next, a third embodiment of the invention will be described with reference to FIG. 4.

In this third embodiment, a capacitor to be connected in series with each switch circuit 21, 22 in the aforementioned first embodiment is shared between the switch circuits 21 and 22.

Figure 4:
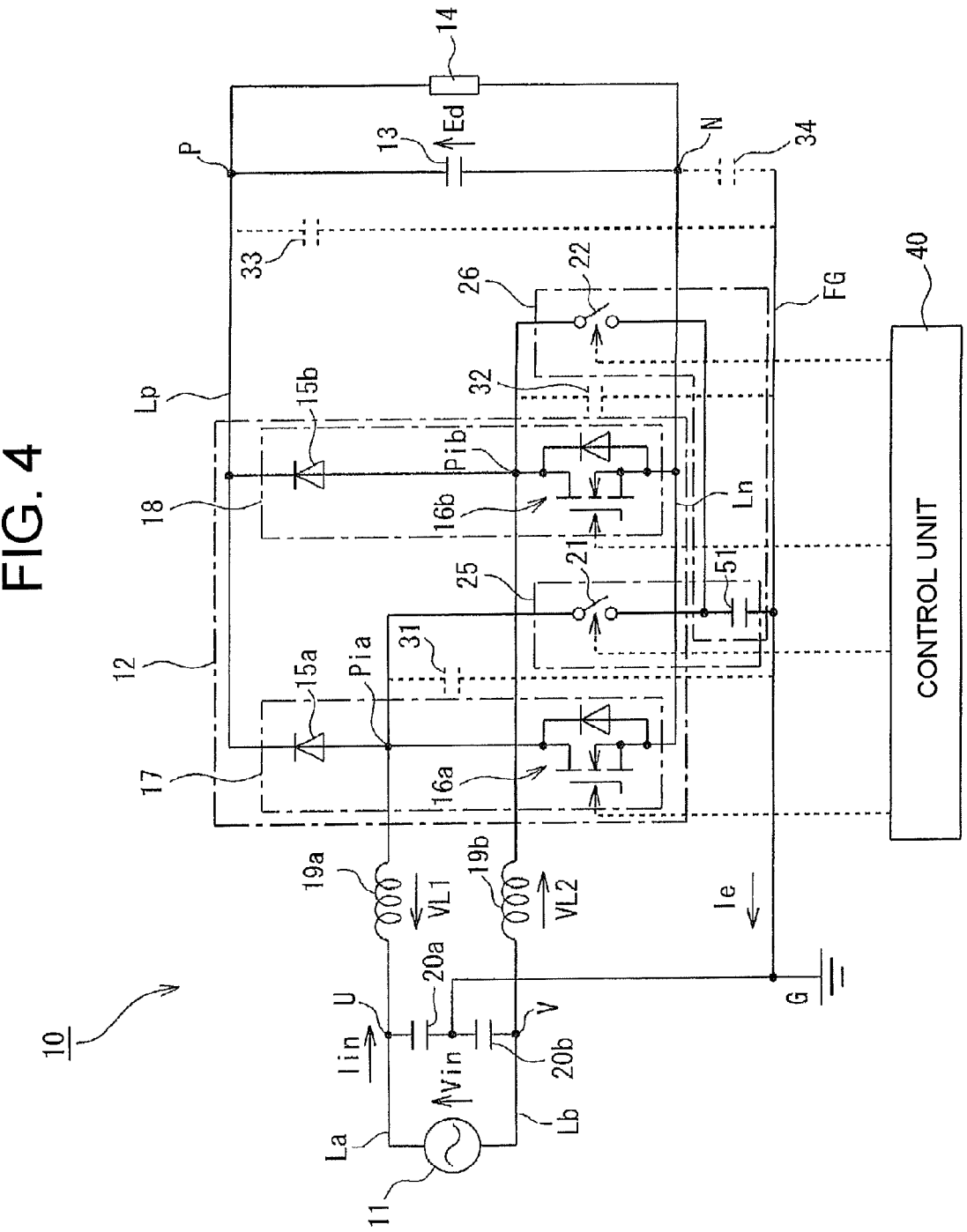
FIG. 4 is a circuit diagram of a power conversion apparatus showing a third embodiment of the invention.

That is, as shown in FIG. 4, the third embodiment has the same configuration as the first embodiment in FIG. 1, except that the switch circuits 21 and 22 are connected to the ground potential G through a shared capacitor 51. Parts corresponding to those in FIG. 1 are referred to by the same numerals, and detailed description thereof will be omitted.

In this third embodiment, identical components are typically used as the diodes 15a and 15b and the MOSFETs 16a and 16b in the first embodiment in order to secure symmetry in the circuitry. Further, when the symmetric circuitry is secured structurally, the parasitic capacitances 31 and 32 also become substantially equal to each other. Hence, the required values of the capacitances of the capacitors 23 and 24 in the first embodiment also become equal to each other. Accordingly, the shared capacitor 51 can be applied as shown in FIG. 4. In this case, the shared capacitor 51 is used so that the switch circuits 21 and 22 are prevented from being turned on concurrently by the control unit 40.

Next, a fourth embodiment of the invention will be described with reference to FIG. 5.

In this fourth embodiment, the rectification circuit is allowed to operate as an inverter.

Figure 5:
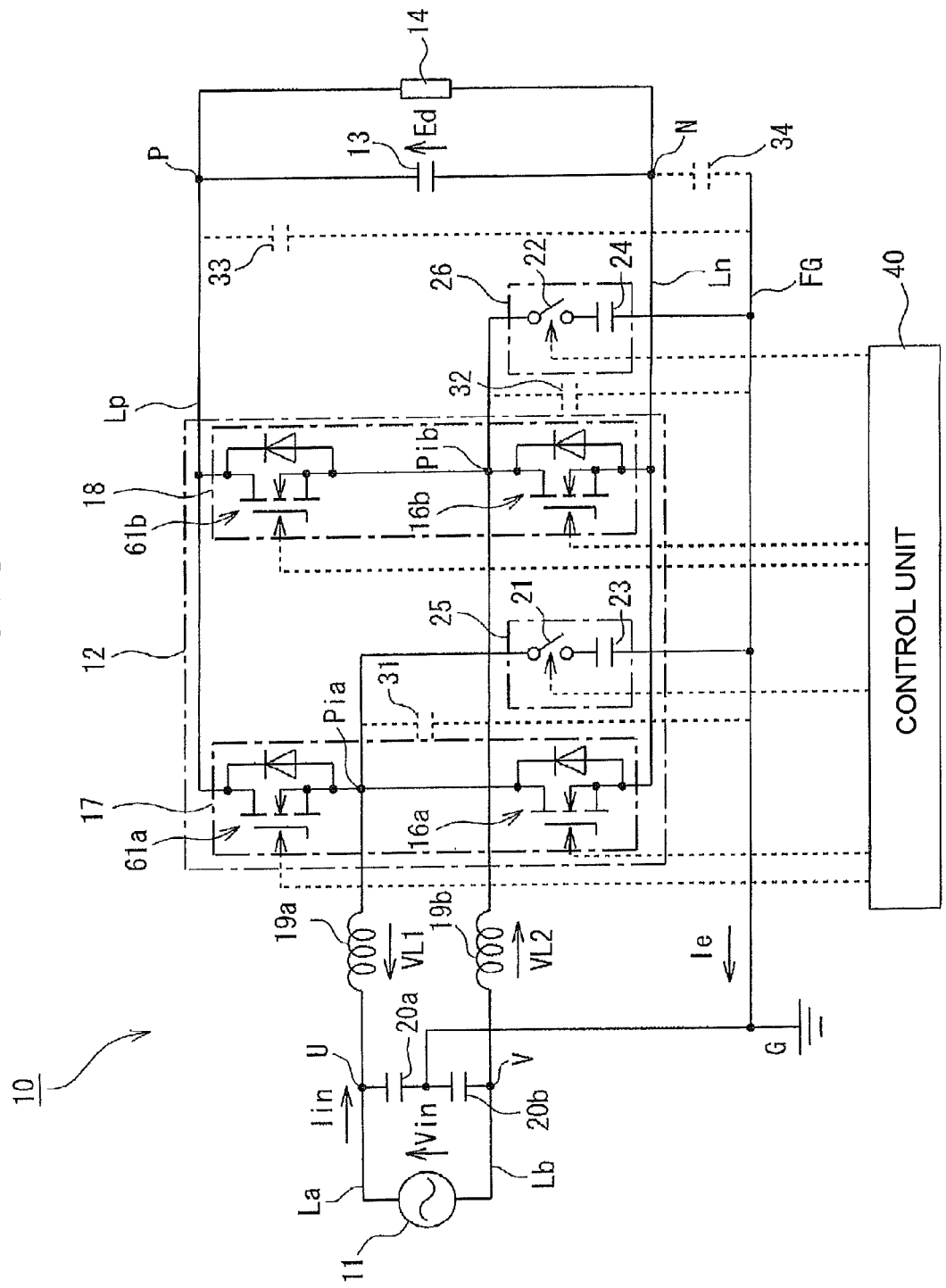
FIG. 5 is a circuit diagram of a power conversion apparatus showing a fourth embodiment of the invention.

That is, as shown in FIG. 5, the fourth embodiment has the same configuration as the first embodiment in FIG. 1, except that the diodes 15a and 15b of the rectification circuit 12 in the aforementioned first embodiment are removed and MOSFETs 61a and 61b having the same configurations as the MOSFETs 16a and 16b are applied in place of the diodes 15a and 15b. Parts corresponding to those in FIG. 1 are referred to by the same numerals, and detailed description thereof will be omitted.

Here, in order to regenerate DC power of a DC load into the AC power supply 11, the MOSFETs 61a and 61b are controlled by the control unit 40 so that the MOSFET 16b is controlled to be on and the MOSFETs 61a and 16a are switched on alternately at a high frequency when the AC voltage Vin is positive. On the other hand, when the AC voltage Vin is negative, the MOSFET 16a is controlled to be on and the MOSFETs 61b and 16b are switched on alternately at a high frequency.

With this configuration, the MOSFETs 61a and 61b are controlled to be off when the AC power of the AC power supply 11 is rectified by the rectification circuit 12. Thus, the MOSFETs 61a and 61b can operate as diodes so as to perform a rectifying operation in the same manner as in the first embodiment.

In addition, assume that DC power is regenerated into the AC power supply 11 in accordance with necessity when the DC load 14 includes an electric motor with dynamic brake, or a battery. In this case, as described above, the MOSFETs 16a, 16b, 61a and 61b are on/off controlled by the control unit 40 in accordance with the polarity of the voltage of the AC power supply 11 so as to operate as an inverter. Thus, the DC power can be converted into AC power and regenerated into the AC power supply 11.

Also in the fourth embodiment, the same configuration as in the second or third embodiment can be applied.

In addition, the fourth embodiment has been described in the configuration where the rectification circuit 12 has an inverter function. However, the invention is not limited thereto. For example, if the DC load 14 is replaced by a DC power supply and the AC power supply 11 is replaced by an AC load, the fourth embodiment can be applied to an inverter for normally converting the DC power of the DC power supply into AC power. Also in this case, the same operation and effect as described above can be obtained.

Further, the fourth embodiment has been described in the case where each of an upper arm and a lower arm forming an inverter is implemented in one switching device. However, the invention is not limited thereto. For example, the fourth embodiment may be applied to a configuration where each of the upper and lower arms includes a plurality of switching devices connected in series.

In addition, the first to fourth embodiments have been described in the case where MOSFETs are used as the switching devices 16a, 16b, 61a and 61b and the switch circuits 21 and 22. However, the invention is not limited thereto. Any switching devices such as insulated gate bipolar transistors (IGBTs), gate turn-off thyristors (GTOs), or static induction transistors (SIT) can be used in accordance with use power.

Figure 6:
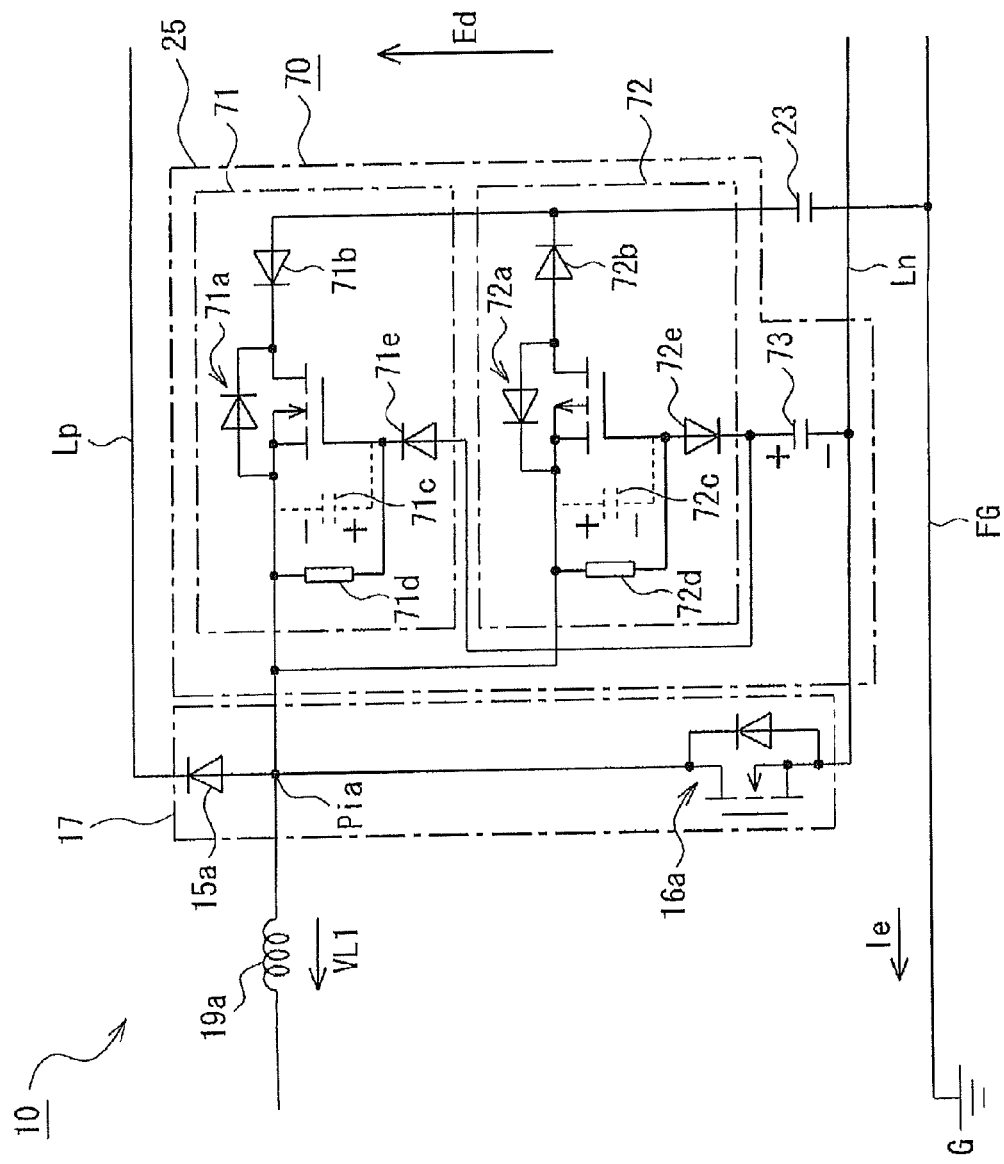
FIG. 6 is a circuit diagram showing a specific configuration of a switch circuit to which embodiments of the invention can be applied.

Further, in alternative embodiments, the switch circuit 21 may be replaced by a switch circuit 70 shown in FIG. 6. The switch circuit 70 is constituted by first and second switch portions 71 and 72 connected in parallel between the AC input point Pia and the capacitor 23 described previously with respect to the first embodiment.

The first switch portion 71 has a series circuit of an re-channel type assistant MOSFET 71a as an assistant switching device, and a diode 71b. The source of the assistant MOSFET 71a is connected to the AC input point Pia. The cathode of the diode 71b is connected to the drain of the assistant MOSFET 71a, and the anode of the diode 71b is connected to the capacitor 23.

Here, the assistant MOSFET 71a has a body diode internally. Thus, the assistant MOSFET 71a is always conductive as to a reverse current regardless of its gate voltage. In addition, there is a parasitic capacitance 71c between the gate and the source of the assistant MOSFET 71a. A discharge resistor 71d is connected in parallel to the parasitic capacitance 71c.

The cathode of a diode 71e is connected to the gate of the assistant MOSFET 71a serving as an on/off control terminal. The anode of the diode 71e is connected to the negative-side line Ln through a capacitor 73.

In the same manner, the second switch portion 72 has a series circuit of a p-channel type assistant MOSFET 72a as an assistant switching device, and a diode 72b. The source of the assistant MOSFET 72a is connected to the AC input point Pia. The anode of the diode 72b is connected to the drain of the assistant MOSFET 72a and the cathode of the diode 72b is connected to the capacitor 23.

Here, the assistant MOSFET 72a has a body diode internally. Thus, the assistant MOSFET 72a is always conductive as to a reverse current regardless of its gate voltage. In addition, there is a parasitic capacitance 72c between the gate and the source of the assistant MOSFET 72a. A discharge resistor 72d is connected in parallel to the parasitic capacitance 72c.

The anode of a diode 72e is connected to the gate of the assistant MOSFET 72a serving as an on/off control terminal. The cathode of the diode 72e is connected to the negative-side line Ln through the capacitor 73.

The discharge time constants of the discharge resistors 71d and 72d of the first and second switch portions 71 and 72 are set to be larger than a switching cycle of the MOSFET 16a.

Only the switch circuit 70 corresponding to the switch circuit 21 in the first embodiment has been described with reference to FIG. 6. Another switch circuit 70 having the same configuration shown in FIG. 6 is also applied to the switch circuit 22.

Next, the operation of the switch circuit 70 configured as described above will be described. In the same manner as in the first embodiment, when the AC input voltage Vin is positive as shown in the section T1 of FIG. 2A, high-frequency switching is performed to turn on/off the MOSFET 16a as a main circuit device at a high frequency.

On this occasion, when the MOSFET 16a is turned off in the state where the parasitic capacitance 72c of the second switch portion 72 and the capacitor 73 are discharged, a part of the AC input current Iin supplied to the AC input point Pia flows into the negative-side line Ln through the parasitic capacitance 72c and the capacitor 73. Thus, the parasitic capacitance 72c and the capacitor 73 are charged.

When the parasitic capacitance 72c is charged, the voltage between the source and the gate of the assistance MOSFET 72a increases to turn on the assistant MOSFET 72a. As a result, the AC input point Pia and the capacitor 23 are connected through the assistant MOSFET 72a, the diode 72b and the capacitor 23 so as to charge the capacitor 23. Here, the charging voltage of the parasitic capacitance 72c can be adjusted by the capacitance of the capacitor 73.

As the parasitic capacitance 72c and the capacitor 73 are charged more, a current flowing through the parasitic capacitance 72c and the capacitor 73 is reduced. As soon as they both have been completely charged, the current flowing through the parasitic capacitance 72c and the capacitor 73 vanishes. The parasitic capacitance 72c is discharged gradually by the discharge resistor 72d.

After that, when the MOSFET 16a which has been off is turned on, the input current Iin supplied to the AC input point Pia flows into the negative-side line Ln through the MOSFET 16a so as to set the potential of the AC input point Pia to be negative. As a result, charges accumulated in the parasitic capacitance 72c of the second switch portion 72 are discharged gradually through the discharge resistor 72d.

Concurrently, the capacitor 73 is discharged through a discharge current path which is formed to range from the positive side of the capacitor 73 to the negative side of the capacitor 73 via the diode 71e and the parasitic capacitance 71c of the first switch portion 71, the MOSFET 16a and the negative-side line Ln.

On this occasion, charges of the capacitor 73 move to the parasitic capacitance 71c to increase the terminal voltage of the parasitic capacitance 71c and thereby turn on the assistance MOSFET 71a. Thus, the capacitor 23 is connected to the AC input point Pia through the diode 71b and the assistant MOSFET 71a.

After that, when the MOSFET 16a is turned off, charging the parasitic capacitance 72c of the second switch portion 72 and the capacitor 73 is started as described previously. Thus, the parasitic capacitance 71c of the first switch portion 71 is discharged gradually by the discharge resistor 71d.

Since the discharge time constants of the discharge resistors 71d and 72d are set to be longer than the switching cycle of the MOSFET 16a, both the assistant MOSFET 71a of the first switch portion 71 and the assistant MOSFET 72a of the second switch portion 72 are kept to be on during the high-frequency switching of the MOSFET 16a, that is, in the section T1 of FIG. 2A. Thus, the capacitor 23 is connected to the AC input point Pia through the first switch portion 71 and the second switch portion 72.

After that, when the MOSFET 16a is fixed to be on or off, charges are prevented from being supplied to the gate of the assistant MOSFET 71a of the first switch portion 71 and the gate of the assistant MOSFET 72a of the second switch portion 72. Thus, the parasitic capacitances 71c and 72c are discharged gradually by the discharge resistors 71d and 72d to reduce the gate voltages of the assistant MOSFETs 71a and 72a. As a result, the assistant MOSFETs 71a and 72a are turned off.

Also in the switch circuit 70 configured thus, therefore, the same operation as in the switch circuit 21 according to the first embodiment can be performed. On this occasion, it is not necessary to control driving the gate of the assistant MOSFET 71a of the first switch portion 71 and the gate of the assistant MOSFET 72a of the second switch portion 72. It is therefore possible to operate the switch circuit 70 without the necessity of providing a special control circuit or an insulated gate drive circuit.

It is particularly difficult to apply a mechanical switch such as a relay to the switch circuit 21 according to the first embodiment because of its response speed and life. Therefore, a semiconductor switching device is used in the same manner as in the main circuit, and the semiconductor switching device is driven by a gate drive circuit. On this occasion, the potential of each switch circuit 21, 22 fluctuates due to switching of the main circuit device. Thus, the gate drive circuit for driving the switching circuit 21, 22 is required to have a function of transmitting an on/off signal from the control potential to the potential of the switching device. This function can be implemented by isolated signal transmission using a pulse transformer or a photo-coupler. However, the gate drive circuit may be complicated, thus increasing its occupied volume or its price. On the other hand, when the switch circuit 70 having the configuration of FIG. 6 is used, such a gate drive circuit can be dispensed with to thereby be able to bring about great contribution to miniaturization.

The switch circuit 70 does not have to be always shifted from the off state to the on state within one switching cycle of the MOSFET 16a as a main circuit device. The capacitance of the capacitor 73 may be set to be low while the resistance values of the discharge resistors 71d and 72d are set at large values, so that the voltages of the parasitic capacitances 71c and 72c can be charged a plurality of times and increased to turn on the assistant MOSFETs 71a and 72a. In this case, a current in a charging circuit can be reduced to miniaturize components and reduce loss. In addition, if the gate voltages of the MOSFETs 71a and 71b increase too much under some conditions, a Zener diode, e.g., may be provided in parallel to each discharge resistor 71d, 72d to suppress the overvoltage.

In addition, although description has been made in the case where the assistant MOSFETs 71a and 71b are used as the switching devices of the first and second switch portions 71 and 72, the invention is not limited thereto. A bipolar junction transistor may be used in place of each MOSFET, for example. In this case, a base current is supplied to the base of the transistor as an on/off control terminal in the same manner as that described above, so that the transistor can be on/off controlled.

Further, description has been made in the configuration of FIG. 6, where the gate of the assistant MOSFET 71a of the first switch portion 71 and the gate of the assistant MOSFET 72a of the second switch portion 72 are connected to the negative-side line Ln through the capacitor 73. However, the invention is not limited thereto. The gate of the assistant MOSFET 71a of the first switch portion 71 and the gate of the assistant MOSFET 72a of the second switch portion 72 may be connected to the positive-side line Lp through the capacitor 73, for example. In this case, the voltage polarity of the capacitor 73 is reversed. When the MOSFET 16a as a main circuit device is turned on in the state where the MOSFET 16a is switched at a high frequency, a current flows from the positive-side line Lp to the negative-side line Ln through the capacitor 73, the diode 71e, the parasitic capacitance 71c and the MOSFET 16a, so as to turn on the assistant MOSFET 71a of the first switch portion 71. When the MOSFET 16a as a main circuit device is turned off in this state, the input current Iin supplied to the AC input point Pia flows to the negative side of the capacitor 73 through the parasitic capacitance 72c of the second switch portion 72 and the diode 72e, so as to turn on the assistant MOSFET 72a of the second switch portion 72. It is therefore possible to obtain operation and effect similar to those in FIG. 6.

Figure 7:
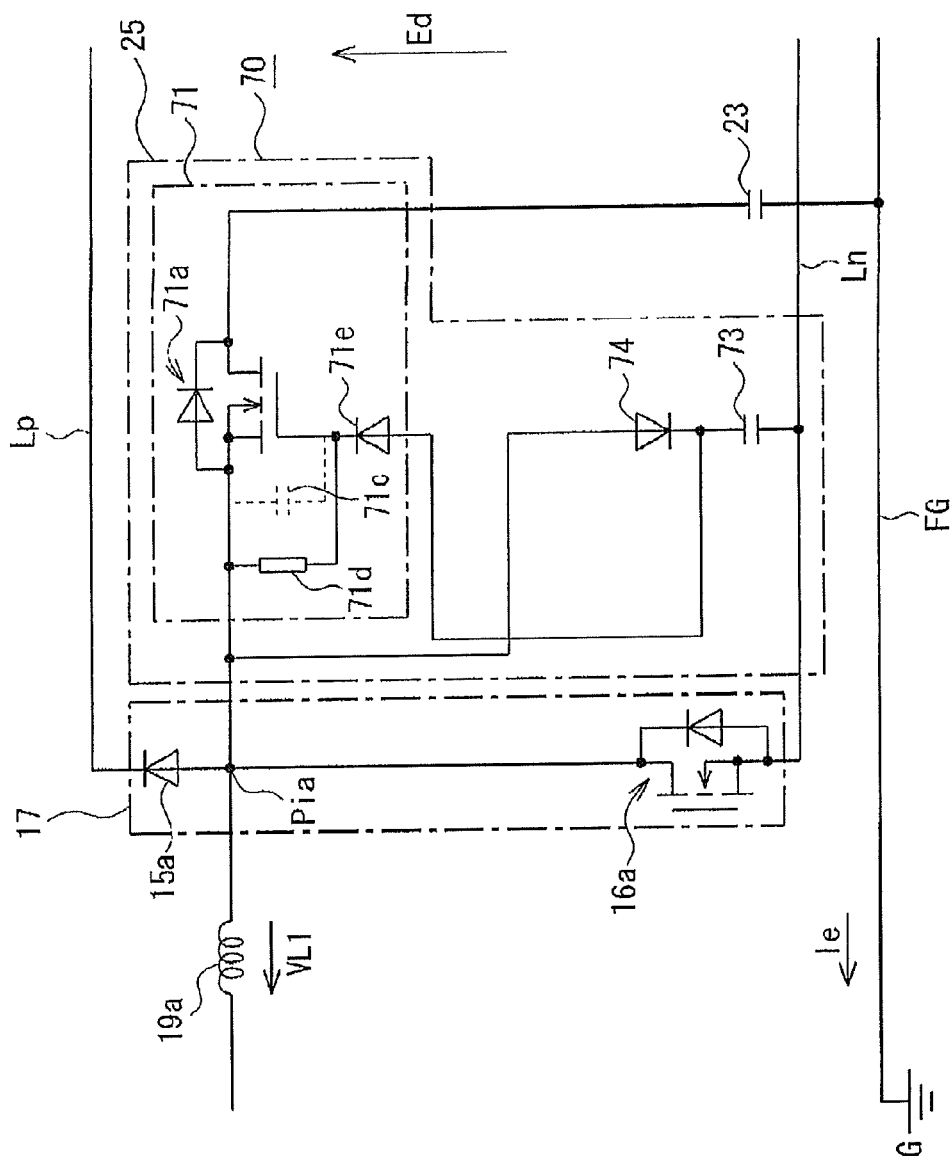
FIG. 7 is a circuit diagram showing a modification of the switch circuit in FIG. 6.
Figure 8:
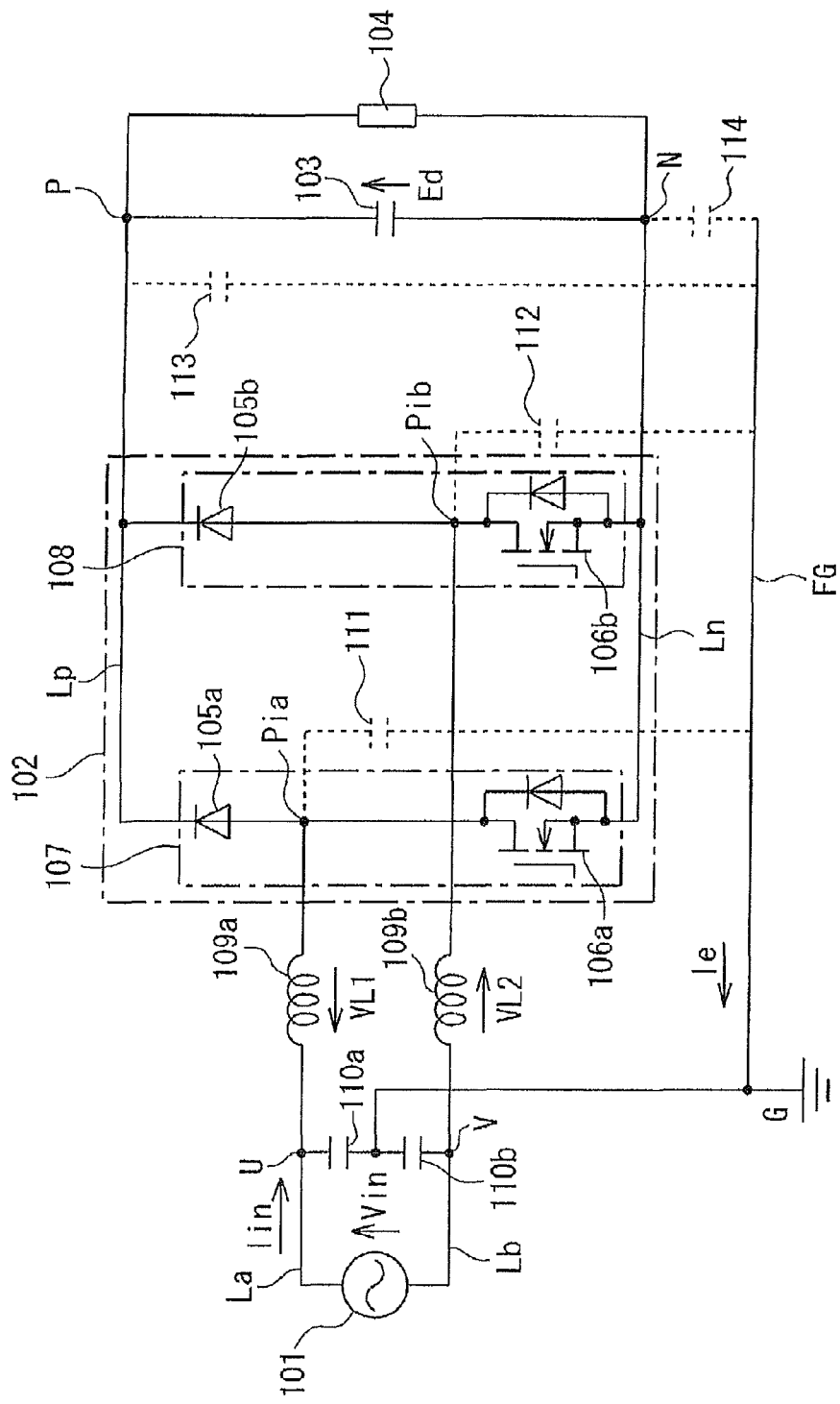
FIG. 8 is a circuit diagram showing a power conversion apparatus according to the background art.
Figure 9:
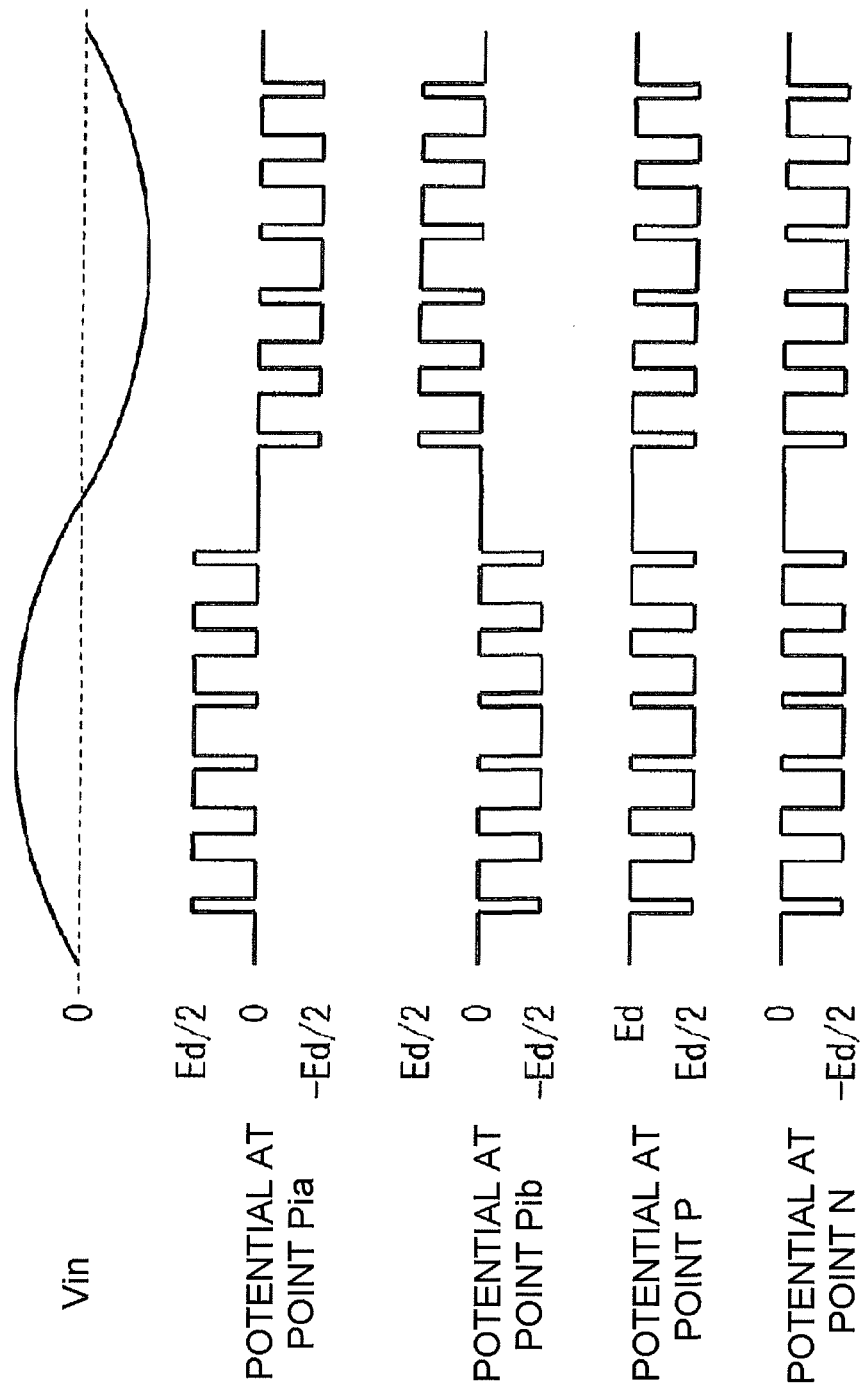
FIG. 9 is a signal waveform chart provided for explaining the operation of the power conversion apparatus according to the background art.

In addition, description has been made in the configuration of FIG. 6, where the switch circuit 70 is constituted by two switch portions, that is, the first switch portion 71 and the second switch portion 72. However, the invention is not limited thereto, but may be configured as shown in FIG. 7, for example. That is, the second switch portion 72 may be removed from the switch circuit 70 in FIG. 6, and a diode 74 may be provided in place of the second switch portion 72. In this case, the anode of the diode 74 is connected to the AC input point Pia, and the cathode of the diode 74 is connected to the capacitor 73. Further, the diode 71b of the first switch portion 71 can be removed.

With this configuration, in the state where the MOSFET 16a as a main circuit device is operated to be switched at a high frequency, the capacitor 73 is charged through the diode 74 when the MOSFET 16a is off, and the capacitor 73 is discharged through the diode 71e and the parasitic capacitance 71c of the first switch portion 71 and the MOSFET 16a when the MOSFET 16a is off. On this occasion, the assistant MOSFET 71a of the first switch portion 71 is controlled to be on by the voltage of the parasitic capacitance 71c. The assistant MOSFET 71a is kept to be on as long as the high-frequency switching state of the MOSFET 16a is continued.

In the switch circuit 70 having the configuration of FIG. 7, in the period T2 of FIG. 2A where the MOSFET 16a as a main circuit device does not perform high-frequency switching, only a current in a direction to discharge the capacitor 23 can be blocked by the assistant MOSFET 71a, but a current in a direction to charge the capacitor 23 cannot be controlled.

Figure 2B:
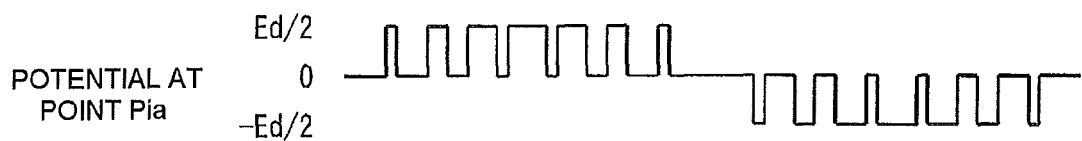
Figure 2C:
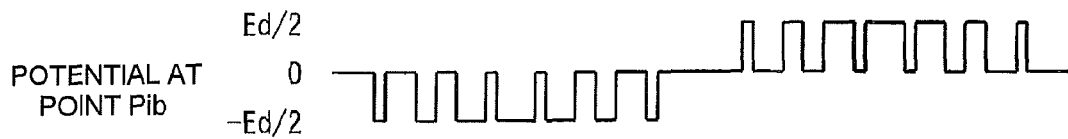
Figure 2D:
Figure 2E:
Figure 2F:
Figure 2G:

However, the peak value of potential fluctuation at the AC input point Pia is substantially fixed as shown in FIG. 2B described previously. Accordingly, once the capacitor 23 has been charged, the capacitor 23 cannot be charged again till the capacitor 23 is discharged. By use of this characteristic, any current can be substantially prevented from flowing into the capacitor 23 by a simple method of blocking either a charge current or a discharge current. That is, the capacitor 23 can be substantially removed from the circuit.

As a result, the capacitor 23 is connected to the AC input point Pia through the assistant MOSFET 71a and its body diode, so that operation and effect similar to those of the first embodiment can be obtained. According to the configuration of FIG. 7, a similar function to that in the configuration of FIG. 6 can be implemented while the number of components is reduced by almost half.

Description has been made in the configuration of FIG. 7, where the second switch portion 72 is removed from the configuration of FIG. 6. The invention is not limited thereto. For example, even if the first switch portion 71 is removed instead, operation and effect similar to those in FIG. 6 can be obtained.

If the capacitor 73 is connected not to the negative-side line Ln but to the positive-side line Lp in the configuration of FIG. 7, the same operation and effect as described above can be obtained.

Further, the first to fourth embodiments have been described in the case where the inductors 19a and 19b are used as inductance devices. The invention is not limited thereto. For example, inductance of wiring may be used, or another inductance may be used.

Further, the first to fourth embodiments have been described in the case where single-phase AC power is converted into DC power by the rectification circuit 12. The invention is not limited thereto. For example, multi-phase AC power of three or more phases can be converted into DC power by the rectification circuit 12. In this case, series circuits whose number corresponds to the number of phases of the multi-phase AC power may be connected in parallel between the positive-side line Lp and the negative-side line Ln.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A power conversion apparatus comprising:
an AC power supply; and
a rectification circuit which converts AC power inputted from the AC power supply into DC power, the rectification circuit having a configuration in which series circuits, each of which includes a rectifying device and a semiconductor switching device connected in series and whose number corresponds to a number of phases of an input AC power, are connected in parallel between a positive-side line and a negative-side line, the AC power supply being connected through inductance devices to AC input points corresponding to connection points between the rectifying devices and the semiconductor switching devices of the series circuits respectively; wherein
the AC input points of the series circuits and a point serving as ground potential are connected through noise suppressing series circuits in each of which a switch unit and a capacitor are connected in series, and
the switch unit of each of the noise suppressing series circuits is controlled to be on at a timing when the semiconductor switching device connected to the noise suppressing series circuit switches at a high frequency, and to be off at another timing.

2. A power conversion apparatus according to claim 1, wherein:
each of the noise suppressing series circuits includes a resistor connected in parallel to the switch unit, and a resistance value of the resistor is set to be sufficiently lower than an impedance of the capacitor to a frequency of AC input power at the AC input point and to be sufficiently higher than the impedance of the capacitor to a switching frequency of the semiconductor switching device.

3. A power conversion apparatus according to claim 2, wherein:
the switch unit includes an assistant semiconductor switching device which can on-off control a forward current and which is always conductive as to a reverse current.

4. A power conversion apparatus according to claim 1, wherein:
the switch unit includes an assistant semiconductor switching device which can on-off control a forward current and which is always conductive as to a reverse current.

5. A power conversion apparatus according to claim 4, wherein:
the assistant semiconductor switching device uses a connection point to each of the switching arms as reference potential for on-off control, and an on-off control terminal of the assistant semiconductor switching device is connected to either a positive side or a negative side of the DC power through a capacitor.

6. A power conversion apparatus comprising:
an inverter circuit which converts DC power into AC power, the inverter circuit having a configuration in which switching arms, each of which includes a plurality of semiconductor switching devices connected in series and whose number corresponds to a number of phases of AC power to be outputted, are connected in parallel between a positive-side line and a negative-side line, AC output points of the switching arms being connected to AC output terminals through inductance devices respectively; wherein:
the AC output points of the switching arms and a point serving as ground potential are connected through noise suppressing series circuits in each of which a switch unit and a capacitor are connected in series; and
the switch unit of each of the noise suppressing series circuits is controlled to be on at a timing when the semiconductor switching device connected to the noise suppressing series circuit switches at a high frequency, and to be off at another timing than the first-mentioned timing.

7. A power conversion apparatus according to claim 6, wherein:
each of the noise suppressing series circuits includes a resistor connected in parallel to the switch unit, and a resistance value of the resistor is set to be sufficiently lower than an impedance of the capacitor to a frequency of AC output power at the AC output point and to be sufficiently higher than the impedance of the capacitor to a switching frequency of the semiconductor switching device.

8. A power conversion apparatus according to claim 7, wherein:
the switch unit includes an assistant semiconductor switching device using a connection point to each of the switching arms as a reference potential for on-off control, and an on-off control terminal of the assistant semiconductor switching device is connected to either a positive side or a negative side of the DC power through a capacitor.

9. A power conversion apparatus according to claim 7, wherein:
the switch unit includes an assistant semiconductor switching device which can on-off control a forward current and which is always conductive as to a reverse current.

10. A power conversion apparatus according to claim 6, wherein:
the switch unit includes an assistant semiconductor switching device which can on-off control a forward current and which is always conductive as to a reverse current.

11. A power conversion apparatus according to claim 6, wherein:
the switch unit includes an assistant semiconductor switching device using a connection point to each of the switching arms as a reference potential for on-off control, and an on-off control terminal of the assistant semiconductor switching device is connected to either a positive side or a negative side of the DC power through a capacitor.

12. A power conversion apparatus comprising:
an AC power supply;
a rectification circuit including a plurality of series circuits connected in parallel between a positive-side line and a negative-side line of the rectification circuit, each of the plurality of series circuits including a semiconductor switching device; and
a plurality of noise suppressing circuits each including a switch unit;
wherein
   each semiconductor switching device is connected to a respective input point of an AC power from the AC power supply, and, through a respective noise suppressing circuit, to a ground potential, and
   each switch unit is controlled to be on at a time when a corresponding semiconductor switching device switches at a high frequency, and to be off at another time.

13. The power conversion apparatus of claim 12, wherein a number of the plurality of series circuits corresponds to a number of phases of the AC input power.

14. The power conversion apparatus of claim 12, each of the plurality of series circuits further including a rectifying device coupled in series to the semiconductor switching device.

15. The power conversion apparatus of claim 14, wherein the respective input point is located between the rectifying device and the semiconductor switching device.

16. The power conversion apparatus of claim 12, each of the plurality of noise suppressing circuits further including a capacitor connected in series to the switch unit.

17. The power conversion apparatus of claim 12, wherein the respective input point is connected to the AC power supply through an inductance device.

* * * * *